United States Patent [19]

Morita et al.

[11] Patent Number: 5,308,392
[45] Date of Patent: May 3, 1994

[54] DRY FRICTION MATERIAL

[75] Inventors: Kazuya Morita, Toyota; Teruo Matsukawa, Nishio; Mikio Harada, Aichi, all of Japan

[73] Assignee: Aisin Kako Kabushiki Kaisha, Aichi, Japan

[21] Appl. No.: 965,012

[22] Filed: Oct. 23, 1992

[30] Foreign Application Priority Data

Oct. 23, 1991 [JP] Japan .................. 3-275393

[51] Int. Cl.$^5$ .............................. C09K 3/14
[52] U.S. Cl. ........................... 106/36; 419/8
[58] Field of Search ................ 106/36; 419/8; 523/156.7

[56] References Cited

U.S. PATENT DOCUMENTS 3,761,256  6/1971  Strom et al. .............. 419/8

OTHER PUBLICATIONS

Database WPIL, AN-92-069984, & JP-A-4 015 285, Jan. 20, 1992.
Database WPIL, AN-79-78184B, & JP-A-54 119 329, Sep. 17, 1979.
Database WPIL, AN-83-768326, & JP-A-58 136 676, Aug. 13, 1983.

*Primary Examiner*—Helene Klemanski
*Assistant Examiner*—Margaret Einsmann
*Attorney, Agent, or Firm*—Oblon, Spivak, McClelland, Maier & Neustadt

[57] ABSTRACT

A dry friction material comprises fiber base material, bonding agent, friction conditioner and filler. The dry friction material contains 2 to 20% by weight of a tin alloy in which the fusing point is more than 500° C. and the hardness is less than 4 Moh's. The dry friction material shows excellent friction characteristics when the load is low or average.

8 Claims, No Drawings

DRY FRICTION MATERIAL

BACKGROUND OF THE INVENTION

1. Field of he Invention

The present invention relates to a dry friction material which is suitable for use as a clutch facing or a disk brake pad of automobiles, industrial machinery, railway rolling stocks and so on.

2. Description of the Related Art

A friction material requires a high and stable friction coefficient, and excellent wear resistance. It is difficult for a single raw material to satisfy these performances. So, a composite material in which many raw materials are mixed is more suitable for a friction material.

The above-mentioned friction materials are classified as follows:

(1) cork, cellulose: A few of them are single substances. Most of them are impregnated with resin and completed by thermoforming.

(2) woven: It is produced by the following manner. A string which is made of asbestos or organic fiber is impregnated with resin. The string is wound round a core which is made of glass fiber or brass wire. Then, thermoforming is performed.

(3) semi mould: It is produced by the following manner. A string is impregnated with resin. A rubber material is charged into the string. Then, thermoforming is performed.

(4) resin mould: It is produced by the following manner. A base material which is made of asbestos or glass fiber is mixed with phenol resin and many kinds of fillers. Then, thermoforming is performed.

(5) rubber mould: It is produced by the following manner. A base material which is made of asbestos or glass fiber is mixed with rubber and many kinds of fillers. Then, thermoforming is performed.

(6) semi metallic: It is produced by the following manner. A base material which is made of metal fiber is mixed with rubber and many kinds of fillers. Then, thermoforming is performed.

(7) sintered metallic: It is produced by the manner that metal powder is sintered.

(8) cermet: It is produced by the manner that ceramic powder and metal powder are sintered.

Among these, semi mould or resin mould is preferably used as a friction material of automobiles. For example, the friction material which is suitable for use as a clutch facing of automobiles is produced by the following manner. A base material which is made of glass fiber is impregnated with phenol resin and compounded rubber. Then, thermoforming is performed.

Conventionally, a dry friction material comprises fiber base material, bonding agent and friction conditioner. In the dry friction material, carbon black, graphite, cashew dust or a lead compound such as lead sulfide or lead sulfate is used as lubricant to improve wear resistance. Especially, cashew dust and the lead compound are useful to improve wear resistance when the load is low or average. However, cashew dust is effective only at the temperature in narrow ranges, and anti fade deteriorates and a friction coefficient decreases. On the contrary, the lead compound is effective at the temperature in wide ranges, and wear resistance remarkably improves. Though, usage control of the lead compound recently progresses on account of environmental contamination or pollution. So, it is necessary to substitute other materials for the lead compound.

SUMMARY OF THE INVENTION

Concerning the above problem, it is an object of the present invention to provide a dry friction material in which a lead compound is not used.

It is another object of the present invention to provide a dry friction material which shows excellent wear resistance when the load is low or average.

Inventors examined for the purpose of obtaining a substitution for a lead compound. They paid attention to tin which has the same characteristics as that of lead. However, tin has a low fusing point of 232° C., and it is unsuitable for use as a friction material. On the contrary, tin oxide has a high fusing point above 1000° C. Though, tin oxide has a hardness of 6.8 Moh's, and wear resistance deteriorates. As the result, inventors happened to think that a tin alloy is used instead of lead. They further studied and finally completed the present invention.

A dry friction material according to the present invention is characterized that it contains 2 to 20% by weight of a tin alloy in which the fusing point is more than 500° C. and the hardness is less than 4 Moh's.

When the fusing point of a tin alloy is less than 500° C., a tin alloy is melted by friction heat at high load, and the characteristics of a tin alloy changes. The fusing point of a tin alloy is preferably more than 700° C. When the hardness is more than 4 Moh's, a thin film which is characteristic of metals is not formed. Furthermore, a tin alloy comes to perform as abradant, and wear resistance deteriorates. The hardness of a tin alloy is preferably less than 3 Moh's.

A friction material preferably contains 2 to 20% by weight of a tin alloy. When the mixed amount of a tin alloy is less than 2% by weight, wear resistance doesn't improve. When the mixed amount of a tin alloy is more than 20% by weight, specific gravity increases, strength decreases, and costs rises. The mixed amount of a tin alloy is preferably in the range of 5 to 10% by weight.

100% by weight of a tin alloy preferably contains 10 to 60% by weight of tin. When the amount of tin of a tin alloy is less than 10% by weight, wear resistance doesn't improve. When the amount of tin of a tin alloy is more than 60% by weight, the fusing point lowers, and wear resistance doesn't improve.

The above-mentioned tin alloy comprises tin and at least one of other metals which have a high fusing point and a low hardness. The tin alloy includes, for example, Cu-Sn alloy, Cu-Sn-Ni alloy, Cu-Sn-Sb alloy, and Cu-Sn-Zn alloy. The tin alloy can be added to a friction material in the form of powder or fiber. The tin alloy is preferably added in the form of having a diameter ranging from 5 to 100 μm.

Concerning a dry friction material according to the present invention, various kinds of materials except a tin alloy can be used as usual. In semi mould and resin mould, fiber base material, bonding agent, friction conditioner and filler can be used as usual. The fiber base material includes, for example, aromatic polyamide fiber, titanic acid potassium whisker or glass fiber. The bonding material includes, for example, phenol resin or epoxy resin. The friction conditioner includes, for example, graphite or cashew dust. The filler includes, for example, barium sulfate, calcium carbonate or magnesium oxide.

When cashew dust is mixed, a friction coefficient after heat history is likely to decrease. To increase the mixed amount of a tin alloy powder prevents a friction coefficient from decreasing. In this case, a mixing ratio of a tin alloy powder to cashew dust is preferably in the range of weight ratio of 1:5 to 2:1. When the mixed amount of a tin alloy powder is too much, a friction coefficient after heat history is likely to decrease. Similarly, when the mixed amount of cashew dust is too much, a friction coefficient after heat history is likely to decrease.

The dry friction material of the present invention contains 2 to 20% by weight of a tin alloy which has a fusing point being more than 500° C. and a hardness being less than 4 Moh's. So, the dry friction material maintains excellent wear resistance without using a lead compound when the load is low or average.

The dry friction material of the present invention has no concern with environmental contamination or pollution. Since the dry friction material has excellent wear resistance, durable and stable friction characteristics can be obtained.

DETAILED DESCRIPTION OF THE EXAMPLES

Having generally described the present invention, a further understanding can be obtained by reference to the specific examples which are provided herein for purposes of illustration only and are not intended to limit the scope of the appended claims.

The examples according to the present invention will be hereinafter described. In the examples, semi mould is used as a friction material.

EXAMPLE 1

As shown in Table 1, Example 1 employed 31 parts by weight of glass fiber, 11 parts by weight of phenol resin, 3 parts by weight of brass wire, 48 parts by weight of compounded rubber and 7 parts by weight of a tin alloy powder; thereby obtaining the dry friction material used for a clutch facing as follows.

The diameter of glass fiber was 6 μm, and bulky processing was performed. The compounded rubber comprised 30% by weight of SBR, 30% by weight of barium sulfate, 7% by weight of active zinc flower, 13% by weight of carbon black, 9% by weight of cashew dust, 10% by weight of sulfur and 1% by weight of vulcanization accelerator. The tin alloy powder is Cu-Sn powder comprising 60% by weight of tin and 40% by weight of copper, and having a fusing point of 500° C. and a hardness of 2.3 Moh's.

11 parts by weight of phenol resin was adhered to 31 parts by weight of glass fiber, and 3 parts by weight of brass wire was added to prepare a string (A). 7 parts by weight of Cu-Sn alloy powder was mixed with 48 parts by weight of compounded rubber to prepare a mixture (B). The mixture (B) was adhered to the string (A) to prepare a string (C). The string (C) was wound to be in a shape of ring, and was disposed in a metallic mold. Then, hot and press forming was performed at 165° C. under a pressure of 160 kg/cm². Finally, a friction surface was formed by polishing, and a dry friction material of the present invention was obtained.

OTHER EXAMPLES AND COMPARATIVE EXAMPLES

As shown in Tables 1 and 2, Examples 2 to 10 and Comparative Examples 1 and 2 employed the same manner as described in Example 1 except that a tin alloy powder is different; thereby obtaining the dry friction material used for a clutch facing.

TABLE 1

| Examples | 1 | 2 | 3 | 4 | 5 | 6 | 7 | 8 | 9 | 10 |
|---|---|---|---|---|---|---|---|---|---|---|
| Sn | 60 | 30 | 10 | 30 | 30 | 30 | 30 | 25 | 20 | 30 |
| Cu | 40 | 70 | 90 | 70 | 70 | 70 | 65 | 65 | 60 | 65 |
| Ni | — | — | — | — | — | — | 5 | 10 | 20 | — |
| Sb | — | — | — | — | — | — | — | — | — | 5 |
| fusing point | 500 | 750 | 1000 | 750 | 750 | 750 | 800 | 1000 | 1150 | 750 |
| hardness | 2.3 | 2.5 | 2.8 | 2.5 | 2.5 | 2.5 | 2.5 | 3.5 | 4.5 | 2.5 |

Example 2 employed Cu-Sn alloy powder comprising 30% by weight of tin and 70% by weight of copper, and having a fusing point of 750° C. and a hardness of 2.5 Moh's.

Example 3 employed Cu-Sn alloy powder comprising 10% by weight of tin and 90% by weight of copper, and having a fusing point of 1000° C. and a hardness of 2.8 Moh's.

Examples 4 to 6 employed Cu-Sn alloy powder comprising 30% by weight of tin and 70% by weight of copper, and having a fusing point of 750° C. and a hardness of 2.5 Moh's.

Example 7 employed Cu-Sn-Ni alloy powder comprising 30% by weight of tin, 65% by weight of copper and 5% by weight of nickel, and having a fusing point of 800° C. and a hardness of 2.5 Moh's.

Example 8 employed Cu-Sn-Ni alloy powder comprising 25% by weight of tin, 65% by weight of copper and 10% by weight of nickel, and having a fusing point of 1000° C. and a hardness of 3.5 Moh's.

Example 9 employed Cu-Sn-Ni alloy powder comprising 20% by weight of tin, 60% by weight of copper and 20% by weight of nickel, and having a fusing point of 1150° C. and a hardness of 4.5 Moh's.

Example 10 employed Cu-Sn-Sb alloy powder comprising 30% by weight of tin, 65% by weight of copper and 5% by weight of antimony, and having a fusing point of 750° C. and a hardness of 2.5 Moh's.

Comparative Example 1 employed no alloy powder.

Comparative Example 2 employed a metallic powder comprising 4.9 parts by weight of Cu powder and 2.1 parts by weight of Sn powder instead of a tin alloy powder.

Concerning the above dry friction materials, wear rate and a friction coefficient were measured by a full-size friction test. The result was shown in Table 2.

TABLE 2

| | | Examples | | | | | | | | | | Comparative Examples | |
|---|---|---|---|---|---|---|---|---|---|---|---|---|---|
| | | 1 | 2 | 3 | 4 | 5 | 6 | 7 Cu-Sn-Ni Alloy Powder | 8 Cu-Sn-Ni Alloy Powder | 9 Cu-Sn-Ni Alloy Powder | 10 Cu-Sn-Sb Alloy Powder | 1 No Alloy Powder | 2 Metallic Powder |
| | | | Cu-Sn Alloy Powder | | | | | | | | | | |
| Composition (weight %) | Glass Fiber | | | 31 | | | | | | 31 | | 31 | |
| | Phenol Resin | | | 11 | | | | | | 11 | | 11 | |
| | Compounded Rubber | | 48 | | 53 | 42 | 35 | | | 48 | | 55 | 48 |
| | Alloy Powder | | 7 | | 2 | 13 | 20 | | | 7 | | — | |
| | Brass Wire | | | 3 | | | | | | 3 | | | 3 |
| | Others | | | — | | | | | | — | | — | Cu Powder 4.9 Sn Powder 2.1 |
| Alloy Characteristics | Tin contained in Alloy | 60 | 30 | | 10 | | 30 | 30 | 25 | 20 | 30 | — | |
| | Fusing Point (°C.) | 500 | 750 | | 1000 | | 750 | 800 | 1000 | 1150 | 750 | — | |
| | Hardness (Moh's) | 2.3 | 2.5 | | 2.8 | | 2.5 | 2.5 | 3.5 | 4.5 | 2.5 | — | |
| Performances | Testing Temperature (°C.) | 200 | 100 | 200 | 300 | 200 | | | | 200 | | 200 | |
| | Wear Rate ($\times 10^{-4}$ mm$^3$/kgm) | 1.8 | 1.0 | 1.3 | 5.5 | 1.7 | 2.0 | 1.6 | 2.2 | 1.3 | 1.7 | 3.3 | 1.4 | 2.5 | 3.1 |
| | Friction Coefficient | .37 | .38 | .38 | .33 | .39 | .40 | .37 | .35 | .39 | .39 | .42 | .37 | .42 | .41 |

The full-size friction test was performed under the condition that the speed of rotation was 1800 rpm, the amount of inertia was 0.3 kg·m·sec², the frequency of engagement was 4000 times, and the testing temperature was 200° C. As for the dry friction material according to Example 2, the full-size friction test was performed at different testing temperatures of 100° C., 200° C. and 300° C. This means that the full-size friction test was performed when the load is low, average and high.

As for the dry friction materials according to Examples 1 to 3 shown in Table 2, as the fusing point of Cu-Sn alloy powder lowers, wear rate becomes high. The fusing point of Cu-Sn alloy powder is preferably 500° C.

Concerning the dry friction materials according to Examples 7 to 9 shown in Table 2, as the hardness of Cu-Sn-Ni alloy powder increases, wear rate becomes high. The dry friction material according to Example 9 is not suitable for practical use because of its wear rate. The hardness of Cu-Sn alloy powder is preferably less than 3 Moh's.

As seen from the dry friction materials according to Examples 2, 4 to 6 shown in Table 2, the mixed amount of Cu-Sn alloy powder is preferably in the range of 2 to 20% by weight. The dry friction material according to Example 2 is most suitable for practical use because the mixed amount of Cu-Sn alloy powder is 7% by weight.

The dry friction material according to Example 2 shows excellent friction characteristics when the load is low or average. When the load is high, the dry friction material shows the same friction characteristics as that of a conventional dry friction material. In this case, it is not harmful to contain Cu-Sn alloy powder.

Concerning the dry friction materials according to Comparative Examples 1 and 2 shown in Table 2, wear rate is high. The dry friction material according to Comparative Example 2 shows higher wear rate than that of Comparative Example 1 because a metallic powder is contained. This means that wear rate becomes high since the fusing point of tin is low. Therefore, it is difficult to improve friction characteristics by using a metallic powder which contains tin.

EXAMPLE 11

In Example 11, 5 parts by weight of aromatic polyamide fiber ("kebler" made by Du Pont), 10 parts by weight of titanic acid potassium whisker, 5 parts by weight of glass fiber, 5 parts by weight of slag wool, 42 parts by weight of barium sulfate, 2 parts by weight of graphite, 6 parts by weight of cashew dust, 10 parts by weight of Cu-Sn alloy powder comprising 30% by weight of tin and 70% by weight of copper, and having a fusing point of 750° C. and a hardness of 2.5 Moh's, 5 parts by weight of antimony trisulfide powder and 10 parts by weight of phenol resin were mixed and molded in a metallic mold; thereby obtaining the dry friction material used for a brake pad.

COMPARATIVE EXAMPLE 3

Comparative Example 3 employed the same compositions and the same manner as described in Example 11 except that a metallic powder comprising 7 parts by weight of Cu powder and 3 parts by weight of Sn powder was used instead of Cu-Sn alloy powder; thereby obtaining the dry friction material used for a brake pad.

Concerning the above dry friction materials, wear rate and a friction coefficient were measured by an abrasion proof test. The result was shown in Table 3.

The abrasion proof test was performed by a brake dynamometer testing machine. The measurement of wear rate was completed by JASO-C427-83 in which the brake type was PD51s, the rotor was 18 mm ventilated type, the initial speed of braking was 50 km/h, the deceleration was 0.3 G, the amount of inertia was 4 kg·m·sec² and the braking temperature was 250° C. The measurement of a friction coefficient was completed by JASO-C406 in accordance with brake dynamometer test classification P1. Friction coefficient before fade is measured under the condition that the amount of inertia was 5 kg·m·sec² and the second validity was 50 km/h.

Friction coefficient after fade is measured under the condition that the third validity was 50 km/h.

TABLE 3

|  | Example 11 | Comparative Example 3 |
| --- | --- | --- |
| Friction Coefficient (before fade) | 0.35 | 0.35 |
| Friction Coefficient (after fade) | 0.35 | 0.30 |
| Wear Rate | 2.5 | 3.0 |

As shown in Table 3, the dry friction material according to Example 11 is superior to the dry friction material according to Comparative Example 3 since a friction coefficient after fade is high and stable, and wear rate is small. Therefore, friction characteristics improves by using Cu-Sn alloy powder instead of the metallic powder comprising 7 parts by weight of Cu powder and 3 parts by weight of Sn powder.

As above mentioned, the dry friction material according to the present invention contains 2 to 20% by weight of a tin alloy in which the fusing point is more than 500° C. and the hardness is less than 4 Moh's. So, the dry friction shows excellent friction characteristics when the load is low or average.

What is claimed is:

1. A dry friction material comprising:
    a fiber base material comprising at least one fiber selected from the group consisting of aromatic polyamide fibers, titanic acid potassium whiskers and glass fibers;
    a bonding agent selected from the group consisting of phenol resin and epoxy resin;
    a friction conditioner selected from the group consisting of graphite and cashew dust;
    a filler selected from the group consisting of at least one of barium sulfate, calcium carbonate and magnesium oxide; and
    2 to 20% by weight of a tin alloy having a fusing point of more than 500° C. and a hardness of less than 4 Moh's.

2. The dry friction material according to claim 1, wherein said tin alloy contains 10 to 60% by weight of tin.

3. The dry friction material according to claim 1, wherein said tin alloy is Cu-Sn alloy, Cu-Sn-Ni alloy, Cu-Sn-Sb alloy or Cu-Sn-Zn alloy.

4. The dry friction material according to claim 1, wherein said tin alloy is added in powder form having a powder size of 5 to 100 μm.

5. The dry friction material according to claim 1, wherein the value of the wear rate is in the range of 1.0 to 2.2.

6. The dry friction material according to claim 1, wherein the value of the friction coefficient is in the range of 0.35 to 0.40.

7. The dry friction material according to claim 1, wherein said dry friction material is free from lead or a lead compound.

8. A dry friction material according to claim 1, further comprising brass wire and compounded rubber.

* * * * *